(12) United States Patent
Plett

(10) Patent No.: US 8,103,485 B2
(45) Date of Patent: *Jan. 24, 2012

(54) STATE AND PARAMETER ESTIMATION FOR AN ELECTROCHEMICAL CELL

(75) Inventor: Gregory L. Plett, Colorado Springs, CO (US)

(73) Assignee: LG Chem, Ltd. (KR)

( * ) Notice: Subject to any disclaimer, the term of this patent is extended or adjusted under 35 U.S.C. 154(b) by 1546 days.

This patent is subject to a terminal disclaimer.

(21) Appl. No.: 10/985,617

(22) Filed: Nov. 11, 2004

(65) Prior Publication Data

US 2006/0100833 A1    May 11, 2006

(51) Int. Cl.
*G06F 17/10* (2006.01)

(52) U.S. Cl. ............ 703/2; 320/137; 320/146; 320/148; 320/163

(58) Field of Classification Search ............ 320/137, 320/146, 148, 163, 118, 127, 132, 149, 152; 324/430, 434, 616; 703/2
See application file for complete search history.

(56) References Cited

U.S. PATENT DOCUMENTS

| | | | |
|---|---|---|---|
| 5,825,155 A * | 10/1998 | Ito et al. | 320/118 |
| 5,982,403 A * | 11/1999 | Inagaki | 347/135 |
| 6,064,180 A | 5/2000 | Sullivan et al. | |
| 6,160,376 A | 12/2000 | Kumar et al. | |
| 6,359,419 B1 * | 3/2002 | Verbrugge et al. | 320/132 |
| 6,441,586 B1 * | 8/2002 | Tate et al. | 320/132 |
| 6,515,454 B2 * | 2/2003 | Schoch | 320/132 |
| 6,534,954 B1 * | 3/2003 | Plett | 320/132 |
| 6,583,606 B2 * | 6/2003 | Koike et al. | 320/149 |
| 6,608,482 B2 * | 8/2003 | Sakai et al. | 324/426 |
| 6,661,201 B2 | 12/2003 | Ueda et al. | |
| 6,829,562 B2 * | 12/2004 | Sarfert | 702/182 |

(Continued)

FOREIGN PATENT DOCUMENTS

JP    2002325373    11/2002

(Continued)

OTHER PUBLICATIONS

T. Hansen, C. Wang, "Support Vector based Battery state of charge Estimator", Journal of Power Sources, (2004).*

(Continued)

*Primary Examiner* — Kamini S Shah
*Assistant Examiner* — Kibrom Gebresilassie
(74) *Attorney, Agent, or Firm* — Cantor Colburn LLP

(57) ABSTRACT

A system and a method for computing an estimated state of charge and an estimated cell resistance of an electrochemical cell are provided. The method includes predicting a first cell resistance value indicating a present resistance of the electrochemical cell utilizing a first nonlinear cell model. The method further includes predicting a first state of charge value indicating a present state of charge of the electrochemical cell utilizing a second nonlinear cell model. The method further includes measuring a voltage and, a current associated with the electrochemical cell to obtain a voltage value and a current value, respectively. The method further includes estimating a second state of charge value indicating the present state of charge of the electrochemical cell utilizing the second nonlinear cell model based on the first state of charge value, the first cell resistance value, the voltage value, and the current value. The method further includes estimating a second cell resistance value indicating the present resistance of the electrochemical cell utilizing the first nonlinear cell model based on the first cell resistance value, the first state of charge value, the voltage value, and the current value.

8 Claims, 2 Drawing Sheets

U.S. PATENT DOCUMENTS

| | | | |
|---|---|---|---|
| 6,876,175 B2 * | 4/2005 | Schoch | 320/132 |
| 6,927,554 B2 * | 8/2005 | Tate et al. | 320/132 |
| 6,943,528 B2 * | 9/2005 | Schoch | 320/132 |
| 6,967,466 B2 * | 11/2005 | Koch | 320/132 |
| 7,012,434 B2 * | 3/2006 | Koch | 324/427 |
| 7,039,534 B1 * | 5/2006 | Ryno et al. | 702/63 |
| 7,098,665 B2 * | 8/2006 | Laig-Hoerstebrock | 324/430 |
| 7,109,685 B2 * | 9/2006 | Tate et al. | 320/132 |
| 7,197,487 B2 * | 3/2007 | Hansen et al. | 706/25 |
| 7,317,300 B2 * | 1/2008 | Sada et al. | 320/136 |
| 7,518,339 B2 | 4/2009 | Schoch | |
| 7,969,120 B2 * | 6/2011 | Plett | 320/145 |
| 8,008,891 B2 * | 8/2011 | Yun et al. | 320/132 |
| 2002/0130637 A1 * | 9/2002 | Schoch | 320/132 |
| 2002/0169581 A1 * | 11/2002 | Sarfert | 702/182 |
| 2002/0196026 A1 * | 12/2002 | Kimura et al. | 324/426 |
| 2003/0146737 A1 * | 8/2003 | Kadouchi et al. | 320/132 |
| 2004/0032264 A1 | 2/2004 | Schoch | |
| 2005/0035742 A1 * | 2/2005 | Koo et al. | 320/149 |
| 2005/0046388 A1 * | 3/2005 | Tate et al. | 320/132 |
| 2005/0154544 A1 * | 7/2005 | Ono | 702/63 |
| 2005/0194936 A1 * | 9/2005 | Cho, II | 320/132 |
| 2006/0022643 A1 * | 2/2006 | Brost et al. | 320/132 |
| 2007/0236181 A1 * | 10/2007 | Palladino | 320/130 |
| 2007/0299620 A1 * | 12/2007 | Yun et al. | 702/63 |

FOREIGN PATENT DOCUMENTS

| | | |
|---|---|---|
| JP | 2004521365 | 7/2004 |
| JP | 2006516326 | 6/2009 |

OTHER PUBLICATIONS

A. K. Fletcher, S. Rangen, V. K. Goyal, "Estimation from Lossy Sensor Data: Jump Linear Modeling and Kalman Filtering"IPSN '04.*

S. C. Rutan, "Recursive Parameter Estimation" 1990.*

G. L. Plett, "Kalman-Filter SOC Estimation for LiPB HEV Cells", Oct. 2002.*

E. A. Wan, A. T. Nelson, "Dual Extended Kalman Filter Methods" 2001.*

Gregory L. Plett; LiPB Dynamic Cell Models for Kalman-Filter SOC Estimation; The 19th International Battery, Hybrid and Fuel Electric Vehicle Symposium and Exhibition; Oct. 19-23, 2002; Susan, Korea; pp. 1-12.

Gregory L. Pletti Kalman-Filter SOC Estimation for LiPB HEV Cells; The 19th International Battery, Hybrid and Fuel Electric Vehicle Symposium and Exhibition; Oct. 19-23, 2002; Busan, Korea; pp. 1-12.

Gregory L. Plett; Advances in EKF SOC Estimation for LiPB HEV Battery Packs; Powering Sustainable Transportation EVS 20; Nov. 15-19, 2003; Long Beach, California; pp. 1-12.

Gregory L. Plett; Extended Kalman Filtering for Battery Management Systems of LiPB-based HEV Battery Packs Part 1 Background; Journal of Power Sources 134; 2004, pp. 252-261.

Gregory L. Plett; Extended Kalman Filtering for Battery Management Systems of LiPB-based HEV Battery Packs Part 2 Modeling and Identification; Journal of Power Sources 134; 2004; pp. 262-276.

Gregory L. Plett; Extended Kalman Filtering for Battery Management Systems of LiPB-based HEV Battery Packs Part 3 State and Parameter Estimation; Journal of Power Sources 134; 2004; pp. 277-292.

Stephen W. Moore and Peter J. Schneider; A Review of Cell Equalization Methods for Lithium Ion and Lithium Polymer Battery Systems; 2001 Society of Automotive Engineers; Jan. 2001; pp. 1-5.

Eric A. Wan and Alex T. Nelson; Dual Extended Kalman Filter Methods; Kalman Filtering and Neural Networks; 2001; pp. 123-173.

Greg Welch and Gary Bishop; An Introduction to the Kalman Filter; SIGGRAPH 2001 Course 8; Los Angeles, California; Aug. 12-17, 2001; http: //info.acm.org/pubs/toc/CRnotice.html; pp. 1-47.

International Search Report for PCT/KR2004/003103 dated Jul. 25, 2005.

* cited by examiner

STATE AND PARAMETER ESTIMATION FOR AN ELECTROCHEMICAL CELL

BACKGROUND

The present invention relates to methods and apparatus for estimation of battery pack system state and model parameters using digital filtering techniques. In particular, dual Kalman filtering and dual extended Kalman filtering.

In the context of rechargeable battery pack technologies, it is desired in some applications to be able to estimate quantities that are descriptive of the present battery pack condition, but that may not be directly measured. Some of these quantities may change rapidly, such as the pack state-of-charge (SOC), which can traverse its entire range within minutes. Others may change very slowly, such as cell capacity, which might change as little as 20% in a decade or more of regular use. The quantities that tend to change quickly comprise the "state" of the system, and the quantities that tend to change slowly comprise the time varying "parameters" of the system.

In the context of the battery systems, particularly those that need to operate for long periods of time, as aggressively as possible without harming the battery life, for example, in Hybrid Electric Vehicles (HEVs), Battery Electric Vehicles (BEVs), laptop computer batteries, portable tool battery packs, and the like, it is desired that information regarding quickly varying parameters (e.g., SOC) be used to estimate how much battery energy is presently available to do work, and so forth. Further, it may be desirable to ascertain information regarding slowly varying parameters (e.g., total capacity) in order to keep the prior calculations precise over the lifetime of the pack, extending its useful service time, and help in determining the state-of-health (SOH) of the pack.

There are a number of existing methods for estimating the state of a cell, which are generally concerned with estimating three quantities: SOC (a quickly varying quantity), power-fade, and capacity-fade (both slowly time varying). Power fade may be calculated if the present and initial pack electrical resistances are known, and capacity fade may be calculated if present and initial pack total capacities are known, for example, although other methods may also be used. Power- and capacity-fade are often lumped under the description "state-of-health" (SOH). Some other information may be derived using the values of these variables, such as the maximum power available from the pack at any given time. Additional state members or parameters may also be needed for specific applications, and individual algorithms would typically be required to find each one.

SOC is a value, typically reported in percent, that indicates the fraction of the cell capacity presently available to do work. A number of different approaches to estimating SOC have been employed: a discharge test, ampere-hour counting (Coulomb counting), measuring the electrolyte, open-circuit voltage measurement, linear and nonlinear circuit modeling, impedance spectroscopy, measurement of internal resistance, coup de fouet, and some forms of Kalman filtering. The discharge test must completely discharge the cell in order to determine SOC. This test interrupts system function while the test is being performed and can be overly time consuming rendering it not useful for many applications. Ampere-hour counting (Coulomb counting) is an "open loop" methodology whose accuracy degrades over time by accumulated measurement error. Measuring the electrolyte is only feasible for vented lead-acid batteries, and therefore has limited applicability. Open-circuit voltage measurement may be performed only after extended periods of cell inactivity, and for cells with negligible hysteresis effect and does not work in a dynamic setting. Linear and nonlinear circuit modeling methods do not yield SOC directly; SOC must be inferred from the calculated values. Impedance spectroscopy requires making measurements not always available in a general application. Measurement of internal resistance is very sensitive to measurement error, and requires measurements not available in general applications. Coup de fouet works for lead-acid batteries only. Forms of Kalman filtering that do not use SOC as a filter state do not directly yield error bounds on the estimate. In another method, described in U.S. Pat. No. 6,534,954, a filter, preferably a Kalman filter is used to estimate SOC by employing a known mathematical model of cell dynamics and measurements of cell voltage, current, and temperature. This method directly estimates state values. However, it does not address parameter values.

Not only is knowledge of SOC desired, but also knowledge of SOH. In this context, power fade refers to the phenomenon of increasing cell electrical resistance as the cell ages. This increasing resistance causes the power that can be sourced/sunk by the cell to drop. Capacity fade refers to the phenomenon of decreasing cell total capacity as the cell ages. Both the cell's resistance and capacity are time-varying parameters. The prior art uses the following different approaches to estimate SOH: the discharge test, chemistry-dependent methods, Ohmic tests, and partial discharge. The discharge test completely discharges a fully charged cell in order to determine its total capacity. This test interrupts system function and wastes cell energy. Chemistry-dependent methods include measuring the level of plate corrosion, electrolyte density, and "coup de fouet" for lead-acid batteries. Ohmic tests include resistance, conductance and impedance tests, perhaps combined with fuzzy-logic algorithms and/or neural networks. These methods require invasive measurements. Partial discharge and other methods compare cell-under-test to a good cell or model of a good cell.

There is a need for a method to concurrently estimate the state and parameters of a cell. Furthermore, there is a need for tests that do not interrupt system function and do not waste energy, methods that are generally applicable (i.e., to different types of cell electrochemistries and to different applications), methods that do not require invasive measurements, and more rigorous approaches. There is a need for methods and apparatus for automatically estimating time-varying parameters, such as the cell's resistance and capacity. There is a need for a method that will work with different configurations of parallel and/or series cells in a battery pack.

SUMMARY OF THE INVENTION

Disclosed herein in one or more exemplary embodiments are methods and apparatus for estimating the state and parameters of an electrochemical cell. More particularly, for example, estimating state and parameter values of a cell.

A first aspect of the invention is a method for estimating present states and present parameters of an electrochemical cell system comprising: estimating a state value of the electrochemical cell with a cell state filter to estimate the state value; estimating a parameter value of the electrochemical cell with a cell parameter filter to estimate the parameter value, and exchanging information between the cell state filter and the cell parameter filter.

Another aspect is an apparatus configured to estimate present states and present parameters of an electrochemical cell comprising: a first component configured to estimate a cell state value; and a second component configured to estimate a cell parameter value. The first component and second component are in operable communication to exchange information there between.

Also disclosed herein in an exemplary embodiment is a system for estimating present states and present parameters of an electrochemical cell comprising: a means for estimating a state value of the electrochemical cell with a cell state filter; a means for estimating a parameter value of the electrochemical cell with a cell parameter filter, and a means for exchanging information between the cell state filter and the cell parameter filter.

Further, disclosed herein in another exemplary embodiment is a storage medium encoded with a machine-readable computer program code including instructions for causing a computer to implement the abovementioned method for estimating present states and present parameters of an electrochemical cell.

Also disclosed herein in yet another exemplary embodiment computer data signal embodied in a computer readable medium. The computer data signal comprises code configured to cause a computer to implement the abovementioned method for estimating present states and present parameters of an electrochemical cell.

BRIEF DESCRIPTION OF THE DRAWINGS

These and other features, aspects and advantages of the present invention will become better understood with regard to the following description, appended claims and accompanying drawing wherein like elements are numbered alike in the several Figures:

DETAILED DESCRIPTION OF THE INVENTION

Figure 1:
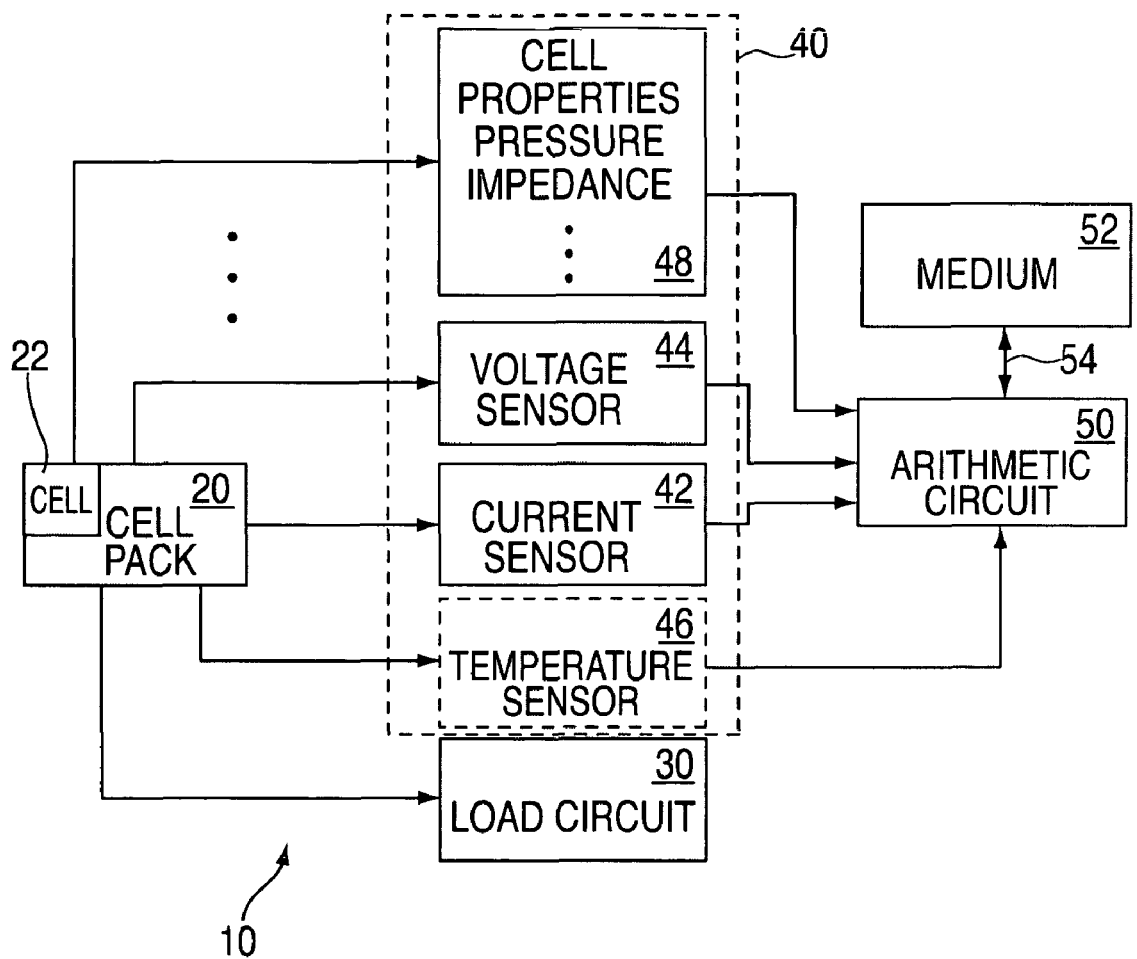
FIG. 1 is a block diagram illustrating an exemplary system for state and parameter estimation in accordance with an exemplary embodiment of the invention.
Figure 2:
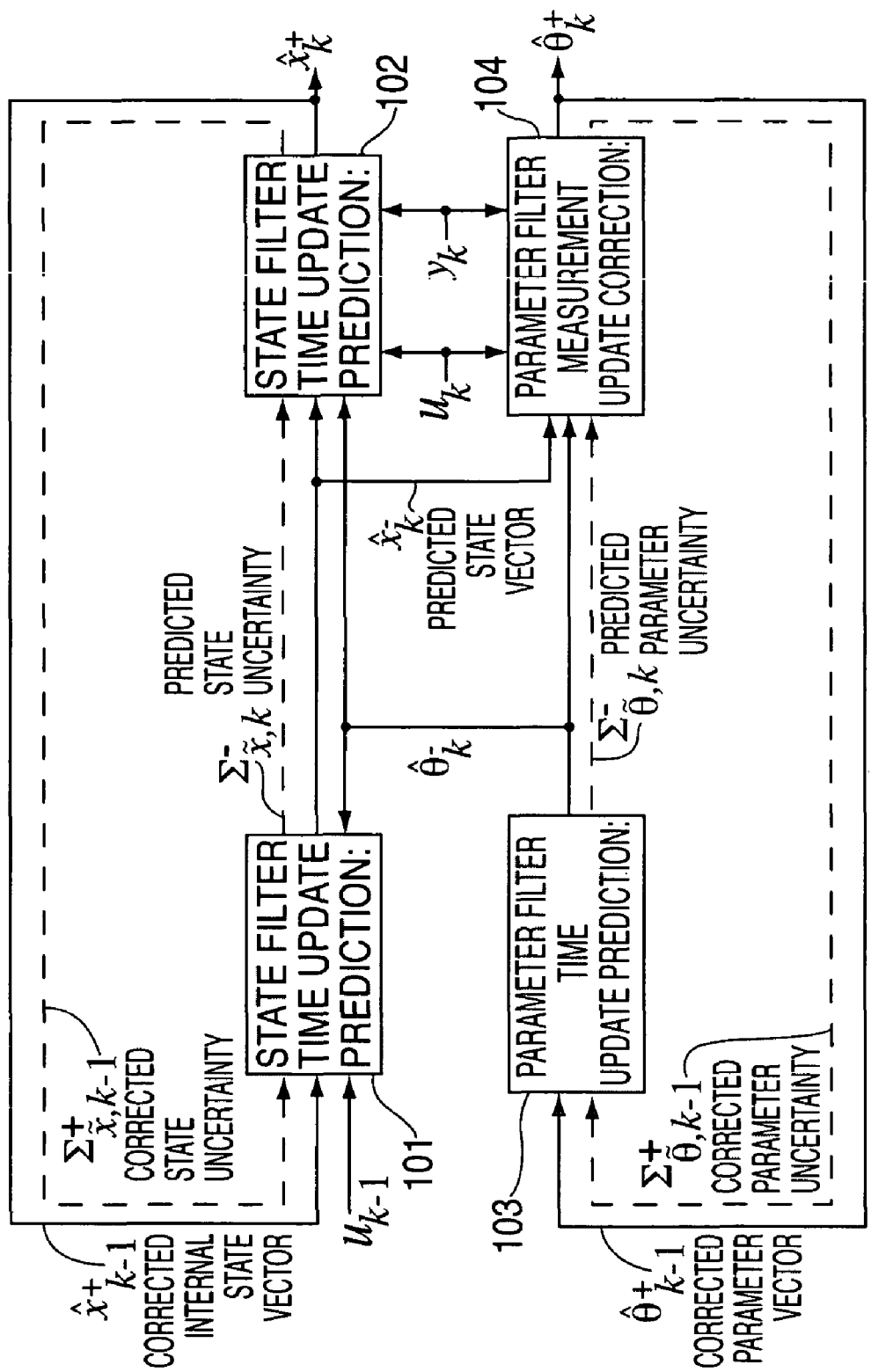
FIG. 2 is a block diagram depicting a method of dual filtering, in accordance with an exemplary embodiment of the invention.

Disclosed herein and various embodiments are methods, systems and apparatus for the estimation of states and parameters of an electrochemical cell using dual filtering are disclosed. Referring now to FIGS. 1 and 2, in the following description, numerous specific details are set forth in order to provide a more complete understanding of the present invention. It will be appreciated that while the exemplary embodiments are described with reference to a battery cell, numerous electrochemical cells hereinafter referred to as a cell, may be employed, including, but not limited to, batteries, battery packs, ultracapacitors, capacitor banks, fuel cells, electrolysis cells, and the like, as well as combinations including at least one of the foregoing. Furthermore, it will be appreciated that a battery or battery pack may include a plurality of cells, where the exemplary embodiments disclosed herein are applied to one or more cells of the plurality.

One or more exemplary embodiments of the present invention estimate cell state and parameter values using dual filtering. One or more exemplary embodiments of the present invention estimate cell state and parameter values using dual Kalman filtering. Some embodiments of the present invention estimate cell state and parameter values using dual extended Kalman filtering. Some embodiments simultaneously estimate SOC, power- and/or capacity-fade, while others estimate additional cell state values and/or additional time-varying parameter values. It will further be appreciated that while the term filtering is employed for description and illustration of the exemplary embodiments, the terminology is intended to include methodologies of recursive prediction and correction commonly denoted as filtering, including but not limited to Kalman filtering and/or extended Kalman filtering.

FIG. 1 shows the components of the state and parameter estimator system 10 according an embodiment of the present invention. Electrochemical cell pack 20 comprising a plurality of cells 22, e.g., battery is connected to a load circuit 30. For example, load circuit 30 could be a motor in an Electric Vehicle (EV) or a Hybrid Electric Vehicle (HEV). An apparatus for measuring various cell characteristics and properties is provided as 40. The measurement apparatus 40 may include but not be limited to a device for measurement of cell terminal voltage such as a voltage sensor 42, e.g. a voltmeter and the like, while measurements of cell current are made with a current sensing device 44, e.g., an ammeter and the like. Optionally, measurements of cell temperature are made with a temperature sensor 46, e.g., a thermometer and the like. Pressure sensors and/or impedance sensors 48 are also possible and may be employed for selected types of cells. Various sensors may be employed as needed to evaluate the characteristics and properties of the cell(s). Voltage, current, and optionally temperature measurements are processed with an arithmetic circuit 50, e.g., processor or computer, which estimates the states and parameters of the cell(s). The system may also include a storage medium 52 comprising any computer usable storage medium known to one of ordinary skill in the art. The storage medium is in operable communication with arithmetic circuit 50 employing various means, including, but not limited to a propagated signal 54. It should be appreciated that no instrument is required to take measurements from the internal chemical components of the cell 22 although such instrumentation may be used with this invention. Also note that all measurements may be non-invasive; that is, no signal must be injected into the system that might interfere with the proper operation of load circuit 30.

In order to perform the prescribed functions and desired processing, as well as the computations therefore (e.g., the modeling, estimation of states and parameters prescribed herein, and the like), arithmetic circuit 50 may include, but not be limited to, a processor(s), gate array(s), custom logic, computer(s), memory, storage, register(s), timing, interrupt(s), communication interfaces, and input/output signal interfaces, as well as combinations comprising at least one of the foregoing. Arithmetic circuit 50 may also include inputs and input signal filtering and the like, to enable accurate sampling and conversion or acquisitions of signals from communications interfaces and inputs. Additional features of arithmetic circuit 50 and certain processes therein are thoroughly discussed at a later point herein.

One or more embodiments of the invention may be implemented as new or updated firmware and software executed in arithmetic circuit 50 and/or other processing controllers. Software functions include, but are not limited to firmware and may be implemented in hardware, software, or a combination thereof. Thus a distinct advantage of the present invention is that it may be implemented for use with existing and/or new processing systems for electrochemical cell charging and control.

In an exemplary embodiment, Arithmetic circuit 50 uses a mathematical model of the cell 22 that includes indicia of a dynamic system state, including, but not, limited to, the SOC as a model state. In one embodiment of the present invention, a discrete-time model is used. An exemplary model in a (possibly nonlinear) discrete-time state-space form has the form:

$$x_{k+1} = f(x_k, u_k, \theta_k) + w_k$$

$$y_k = g(x_k, u_k, \theta_k) + v_k, \quad (1)$$

where $x_k$ is the system state, $\theta_k$ is the set of time varying model parameters, $u_k$ is the exogenous input, $y_k$ is the system output, and $w_k$ and $v_k$ are "noise" inputs—all quantities may be scalars or vectors. $f(x_k, u_k, \theta_k)$ and $g(x_k, u_k, \theta_k)$ are functions defined by the cell model being used. Non-time-varying numeric values required by the model may be embedded within $f(x_k, u_k, \theta_k)$ and $g(x_k, u_k, \theta_k)$, and are not included in $\theta_k$.

The system state includes, at least, a minimum amount of information, together with the present input and a mathematical model of the cell, needed to predict the present output. For a cell 22, the state might include: SOC, polarization voltage levels with respect to different time constants, and hysteresis levels, for example. The system exogenous input $u_k$ includes at minimum the present cell, current $i_k$ and may, optionally, include cell temperature (unless temperature change is itself modeled in the state). The system parameters $\theta_k$ are the values that change only slowly with time, in such a way that they may not be directly determined with knowledge of the system measured input and output. These might include: cell capacity, resistance, polarization voltage time constant(s), polarization voltage blending factor(s), hysteresis blending factor(s), hysteresis rate constant(s), efficiency factor(s), and so forth. The model output $y_k$ corresponds to physically measurable cell quantities or those directly computable from measured quantities at minimum for example, the cell voltage under load.

A mathematical model of parameter dynamics is also utilized. An exemplary model has the form:

$$\theta_{k+1} = \theta_k + r_k$$

$$d_k = g(x_k, u_k, \theta_k) + e_k. \quad (2)$$

The first equation states that the parameters are essentially constant, but that they may change slowly over time, in this instance, modeled by a fictitious "noise" process denoted, $r_k$. The "output" of the optimum parameter dynamics is the cell output estimate plus some estimation error $e_k$.

With models of the system state dynamics and parameter dynamics defined, in an exemplary embodiment, a procedure of dual filtering is applied. Once again, alternatively, dual Kalman filters may be employed, or dual extended Kalman filters. Furthermore, combinations of the abovementioned may also be employed. Table 1 is an exemplary implementation of the methodology and system utilizing dual extended Kalman filtering. The procedure is initialized by setting the parameter estimate $\hat{\theta}$ to the best guess of the true parameters, e.g., $\hat{\theta} = E[\theta_0]$, and by setting the state estimate $\hat{x}$ to the best estimate of the cell state, e.g., $\hat{x} = E[x_0]$. The estimation-error covariance matrices $$\sum_{\hat{x}}^{+}$$

and $$\sum_{\hat{\theta}}^{+}$$

are also initialized. For example, an initialization of SOC might be estimated/based on a cell voltage in a look-up table, or information that was previously stored when a battery pack/cell was last powered down. Other examples might incorporate the length of time that the battery system had rested since powerdown and the like.

TABLE 1

Dual extended Kalman filter for state and weight update.

State-space models:

$$x_{k+1} = f(x_k, u_k, \theta_k) + w_k \quad \theta_{k+1} = \theta_k + r_k$$
$$y_k = g(x_k, u_k, \theta_k) + v_k \quad \text{and} \quad d_k = g(x_k, u_k, \theta_k) + e_k,$$

where $w_k$, $v_k$, $r_k$ and $e_k$ are independent, zero-mean,
Gaussian noise processes of covariance matrices $\Sigma_w$, $\Sigma_v$, $\Sigma_r$ and $\Sigma_e$, respectively.

Definitions:

$$A_{k-1} = \left.\frac{\partial f(x_{k-1}, u_{k-1}, \hat{\theta}_k^-)}{\partial x_{k-1}}\right|_{x_{k-1}=\hat{x}_{k-1}^+} \quad C_k^x = \left.\frac{\partial g(x_k, u_k, \hat{\theta}_k^-)}{\partial x_k}\right|_{x_k=\hat{x}_k^-}$$

$$C_k^\theta = \left.\frac{d g(\hat{x}_k^-, u_k, \theta)}{d \theta}\right|_{\theta=\hat{\theta}_k^-}$$

Initialization. For $k = 0$, set $$\hat{\theta}_0^+ = E[\theta_0], \quad \sum_{\hat{\theta},0}^{+} = E\left[(\theta_0 - \hat{\theta}_0^+)(\theta_0 - \hat{\theta}_0^+)^T\right]$$

$$\hat{x}_0^+ = E[x_0], \quad \sum_{\hat{x},0}^{+} = E\left[(x_0 - \hat{x}_0^+)(x_0 - \hat{x}_0^+)^T\right].$$

Computation. For $k = 1, 2, \ldots$, compute:
Time update for the weight filter [I corrected the following equation]

$$\hat{\theta}_k^- = \hat{\theta}_{k-1}^+$$

$$\sum_{\hat{\theta},k}^{-} = \sum_{\hat{\theta},k-1}^{+} + \sum_r.$$

Time update for the state filter $$\hat{x}_k^- = f(\hat{x}_{k-1}^+, u_{k-1}, \hat{\theta}_k^-)$$

$$\sum_{\hat{x},k}^{-} = A_{k-1} \sum_{\hat{x},k-1}^{+} A_{k-1}^T + \sum_w.$$

Measurement update for the state filter $$L_k^x = \sum_{\hat{x},k}^{-} (C_k^x)^T \left[C_k^x \sum_{\hat{x},k}^{-} (C_k^x)^T + \sum_v\right]^{-1}$$

$$\hat{x}_k^+ = \hat{x}_k^- + L_k^x[y_k - g(\hat{x}_k^-, u_k, \hat{\theta}_k^-)]$$

$$\sum_{\hat{x},k}^{+} = (I - L_k^x C_k^x) \sum_{\hat{x},k}^{-}.$$

TABLE 1-continued

Dual extended Kalman filter for state and weight update.

Measurement update for the weight filter $$L_k^\theta = \sum_{\tilde{\theta},k} (C_k^\theta)^T \left[ C_k^\theta \sum_{\tilde{\theta},k} (C_k^\theta)^T + \sum_e \right]^{-1}$$

$$\hat{\theta}_k^+ = \hat{\theta}_k^- + L_k^\theta [y_k - g(\hat{x}_k^-, u_k, \hat{\theta}_k^-)]$$

$$\sum_{\tilde{\theta},k}^+ = (I - L_k^\theta C_k^\theta) \sum_{\tilde{\theta},k}^-.$$

In this example, several steps are performed in each measurement interval. First, the previous parameter estimate is propagated forward in time. The new parameter estimate is equal to the old parameter estimate, and the parameter error uncertainty is larger due to the passage of time (accommodated for in the model by the fictitious driving noise $r_k$). Various possibilities exist for updating the parameter uncertainty estimate—the table gives only one example. The state estimate and its uncertainty are propagated forward one step in time. A measurement of the cell output is made, and compared to the predicted output based on the state estimate, $\hat{x}$ and parameter estimate, $\hat{\theta}$; the difference is used to update the values of $\hat{x}$ and $\hat{\theta}$. It may readily be appreciated that the steps outlined in the table may be performed in a variety of orders. While the table lists an exemplary ordering for the purposes of illustration, those skilled in the art will be able to identify many equivalent ordered sets of equations.

Turning now to FIG. 2 as well, an exemplary implementation of an exemplary embodiment of the invention is depicted. Two filters run in parallel are depicted. One filter 101/102 adapting the state estimate, $\hat{x}$ and one filter 103/104 adapting the parameter estimate, $\hat{\theta}$. Additionally, information exchange between the filters permits updates from the parameter estimation filter 103/104 to the state estimation filter 101/102. Both filters 101/102, 103/104 have a time update or prediction aspect and a measurement update or correction aspect. State time update/prediction block 101 receives as input the previous exogenous input $u_{k-1}$ (which might include cell current and/or temperature, for example) along with the previously estimated system state value $\hat{x}_{k-1}^+$ and state uncertainty estimate $$\sum_{\tilde{x},k-1}^+,$$

and present predicted parameters $\hat{\theta}_k^-$. The state time update/prediction block 101 provides predicted state $\hat{x}_k^-$ and predicted state uncertainty $$\sum_{\tilde{x},k}^-$$

output to state measurement update/correction block 102, and to parameter measurement update/correction block 104. State measurement update/correction block 102 provides current system state estimate $\hat{x}_k^+$ and state uncertainty estimate $$\sum_{\tilde{x},k}^+.$$

Parameter time update/prediction block 103 receives as input the previous time varying parameters estimate $\hat{\theta}_{k-1}^+$ and parameter uncertainty estimate $$\sum_{\tilde{\theta},k-1}^+.$$

Parameter time update/prediction block 103 outputs predicted parameters $\hat{\theta}_k^-$ and predicted parameter uncertainty $$\sum_{\tilde{\theta},k}^-$$

to the parameter measurement update/correction block 104 and state time update block 101. Parameter measurement update block 104, which provides current parameter estimate $\hat{\theta}_k^+$ and parameter uncertainty estimate $$\sum_{\tilde{\theta},k}^+.$$

It will also be appreciated that a minus notation denotes that the vector is the result of the prediction components 101, 103 of the filters, while the plus notation denotes that the vector is the result of the correction component 102/104 of the filters.

Embodiments of this invention require a mathematical model of cell state and output dynamics for the particular application. In the examples above, this is accomplished by defining specific functions for $f(x_k, u_k, \theta_k)$ and $g(x_k, u_k, \theta_k)$. An exemplary embodiment uses a cell model that includes effects due to one or more of the open-circuit-voltage (OCV) for the cell 22, internal resistance, voltage polarization time constants, and a hysteresis level. For the purpose of example, parameter values are fitted to this model structure to model the dynamics of high-power Lithium-Ion Polymer Battery (LiPB) cells, although the structure and methods presented here are general and apply to other electrochemistries.

In this example, SOC is captured by one state of the model. This equation is $$z_k[m+1] = z_k[m] - (\eta_i \Delta t/C_k) i_k[m] \quad (3)$$

where $\Delta t$ represents the inter-sample period (in seconds), $C_k$ represents the capacity of cell number k in the pack (in ampere-seconds), $z_k[m]$ is the SOC of cell k at time index m, $i_k$ is the current out of cell k, and $\eta_i$ is the Coulombic efficiency of a cell at current level $i_k$.

In this example, the polarization voltage levels are captured by several filter states. If we let there be $n_f$ polarization voltage time constants, then $$f_k[m+1] = A_f f_k[m] + B_f i_k[m] \quad (4)$$

The matrix $A_f \in \Re^{n_f \times n_f}$ may be a diagonal matrix with real-valued polarization voltage time constants $a_1 \ldots a_{n_f}$. If so, the system is stable if all entries have magnitude less than one. The vector $B_f \in \Re^{n_f \times 1}$ may simply be set to $n_f$ "1"s. The entries of $B_f$ are not critical as long as they are non-zero. The value of $n_f$ entries in the $A_f$ matrix are chosen as part of the system identification procedure to best fit the model parameters to measured cell data. The $A_f$ and $B_f$ matrices may vary with time and other factors pertinent to the present battery pack operating condition.

In this example, the hysteresis level is captured by a single state $$h_k[m+1] = \exp\left(-\left|\frac{\eta_i i_k[m]\gamma\Delta t}{C}\right|\right)h_k[m] + \left(1 - \exp\left(-\left|\frac{\eta_i i_k[m]\gamma\Delta t}{C}\right|\right)\right)sgn(i_k[m]), \quad (5)$$

where $\gamma$ is the hysteresis rate constant, again found by system identification.

In this example, the overall model state is $x_k[m]=[f_k[m]^T \; h_k[m] \; z_k[m]]^T$, where other orderings of states are possible. The state equation for the model is formed by combining all of the individual equations identified above.

In this example, the output equation that combines the state values to predict cell voltage is $$v_k[m]=OCV(z_k[m])+Gf_k[m]-Ri_k[m]+Mh_k[m], \quad (6)$$

where $G \in \mathfrak{R}^{1 \times n_f}$ is a vector of polarization voltage blending factors $g_1 \ldots g_{n_f}$ that blend the polarization voltage states together in the output, R is the cell resistance (different values may be used for discharge/charge), and M is the hysteresis blending factor. Note, G may be constrained such that the dc-gain from $i_k$ to $Gf_k$ is zero.

In this example, the parameters are $$\theta=[\eta,C,a_1 \ldots a_{n_f},g_1 \ldots g_{n_f-1},\gamma,R,M]^T. \quad (7)$$

In any embodiment, the dual filters will adapt a state estimate and a parameter estimate so that a model input-output relationship matches the measured input-output data as closely as possible. This does not guarantee that the model state converges to physical state values. An exemplary embodiment takes extra steps to ensure that one model state converges to SOC. In yet another embodiment, the cell model used for dual filtering may be augmented with a secondary cell model that includes as outputs those states that must converge to their correct values. A specific example of such an augmented cell model (with output augmented with SOC) is $$g(x_k, u_k, \theta) = \begin{bmatrix} OCV(z_k) - Ri_k + h_k + Gf_k \\ z_k \end{bmatrix}. \quad (8)$$

The augmented model output is compared to a measured output in the dual filter. In an exemplary embodiment, a measured value for SOC may be approximated using $\hat{z}_k$ derived as $$y_k \approx OCV(z_k) - Ri_k$$

$$OCV(z_k) \approx y_k + Ri_k$$

$$\hat{z}_k = OCV^{-1}(v_k + Ri_k). \quad (9)$$

By measuring the voltage of a cell under load, the cell current, and having knowledge of R, (perhaps through $\hat{\theta}$ from a dual filter), and knowing the inverse OCV function for the cell chemistry, this example computes a noisy estimate of SOC, $\hat{z}_k$.

In this example, a dual filter is run on this modified model, with the "measured" information in the measurement update being $$\begin{bmatrix} v_k \\ \hat{z}_k \end{bmatrix}.$$

Experimentation has shown that while the "noise" of $\hat{z}_k$ (short-term bias due to hysteresis effects and polarization voltages being ignored) prohibits it from being used as the primary estimator of SOC, its expected long-term behavior in a dynamic environment is accurate, and maintains the accuracy of the SOC state in the dual filter.

Another exemplary embodiment includes methods for estimating important aspects of SOH without employing a full dual filter. The full dual filter method may be computationally intensive. If precise values for the full set of cell model parameters are not necessary, then other methods potentially less complex or computationally intensive might be used. The exemplary methodologies determine cell capacity and resistance using filtering methods. The change in capacity and resistance from the nominal "new-cell" values give capacity fade and power fade, which are the most commonly employed indicators of cell SOH.

In this example, to estimate cell resistance using a filtering mechanism, we formulate a model:

$$R_k[m+1]=R_k[m]+r_k[m]$$

$$y_k[m]=OCV(z_k[m])-i_k[m]R_k[m]+e_k[m] \quad (10)$$

where $R_k[m]$ is the cell resistance and is modeled as a constant value with a fictitious noise process $r_k$ allowing adaptation. $y_k[m]$ is a crude estimate of the cell's voltage, $i_k$ is the cell current, and $e_k$ models estimation error. If we use an estimate of $z_k$ from the state filter in a dual estimator, or from some other source, then we simply apply a filter to this model to estimate cell resistance. In the standard filter, we compare the model's prediction of $y_k$ with the true measured cell voltage, and use the difference to adapt $R_k$.

Note that the above model may be extended to handle different values of resistance for a variety of conditions of the cell. For example, differences based on charge and discharge, different SOCs, and different temperatures. The scalar $R_k$ would be changed into a vector comprising all of the resistance values being modified, and the appropriate element from the vector would be used each time step of the filter during the calculations.

In this example, to estimate cell capacity using a filter, we again formulate a cell model:

$$C_k[m+1]=C_k[m]+r_k[m]$$

$$0=z_k[m]-z_k[m-1]+\eta_i i_k[m-1]\Delta t/C_k[m-1]+e_k[m]. \quad (11)$$

Again, a filter is formulated using this model to produce a capacity estimate. As the filter runs, the computation in the second equation (right-hand-side) is compared to zero, and the difference is used to update the capacity estimate. Note that good estimates of the present and previous states-of-charge are desired, possibly from a filter estimating SOC. Estimated capacity may again be a function of temperature (and so forth), if desired, by employing a capacity vector, from which the appropriate element is used in each time step during calculations.

Thus, a method for simultaneous estimation of cell state and parameters has been described in conjunction with a number of specific embodiments. One or more embodiments use one or more Kalman filters. Some embodiments use one or more extended Kalman filters. Further, some embodiments include a mechanism to force convergence of state-of-charge. One or more embodiments include a simplified parameter filter to estimate resistance, while some embodiments include a simplified parameter filter to estimate total capacity. The present invention is applicable to a broad range of applications, and cell electrochemistries.

The disclosed method may be embodied in the form of computer-implemented processes and apparatuses for practicing those processes. The method can also be embodied in the form of computer program code containing instructions embodied in tangible media 52, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal 54 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated. Furthermore, the use of the terminology "a" and "at least one of" shall each be associated with the meaning "one or more" unless specifically stated otherwise.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining an estimated state of charge value and an estimated cell resistance value associated with an electrochemical cell comprising:
   predicting a first cell resistance value indicating a present resistance of the electrochemical cell utilizing a first nonlinear cell model;
   predicting a first state of charge value indicating a present state of charge of the electrochemical cell utilizing a second nonlinear cell model;
   measuring a voltage associated with the electrochemical cell to obtain a voltage value;
   measuring a current associated with the electrochemical cell to obtain a current value;
   calculating a second state of charge value associated with the electrochemical cell, utilizing an inverse open circuit voltage function having a parameter determined from the voltage value and the current value;
   calculating the estimated state of charge value indicating the present state of charge of the electrochemical cell utilizing the second nonlinear cell model based on the first state of charge value, the second state of charge value, the first cell resistance value, the voltage value, and the current value;
   calculating the estimated cell resistance value indicating the present resistance of the electrochemical cell utilizing the first nonlinear cell model based on the first cell resistance value, the first state of charge value, the second state of charge value, the voltage value, and the current value, and
   storing the estimated state of charge value and the estimated cell resistance value in a storage medium.

2. The method of claim 1, further comprising:
   predicting a first voltage polarization value indicating a present voltage polarization level of the electrochemical cell utilizing the second nonlinear cell model; and
   estimating a second voltage polarization value indicating the present voltage polarization level of the electrochemical cell utilizing the second nonlinear cell model based on the first voltage polarization value, the first state of charge value, the voltage value, and the current value.

3. The method of claim 1, further comprising:
   predicting a first hysteresis value indicating a present hysteresis of the electrochemical cell utilizing the second nonlinear cell model; and
   estimating a second hysteresis value indicating the present hysteresis of the electrochemical cell utilizing the second nonlinear cell model based on the first hysteresis value, the first state of charge value, the voltage value, and the current value.

4. The method of claim 1, further comprising:
   predicting a first capacity value indicating a present capacity the electrochemical cell utilizing the first nonlinear cell model; and
   estimating a second capacity value indicating the present capacity of the electrochemical cell utilizing the first nonlinear cell model based on the first capacity value, the first state of charge value, the voltage value, and the current value.

5. A system for determining an estimated state of charge value and an estimated cell resistance value associated with of an electrochemical cell, comprising:
   an arithmetic circuit configured to predict a first cell resistance value indicating a present resistance of the electrochemical cell utilizing a first nonlinear cell model;
   the arithmetic circuit further configured to predict a first state of charge value indicating a present state of charge of the electrochemical cell utilizing a second nonlinear cell model;
   a voltage sensor configured to measure a voltage associated with the electrochemical cell to obtain a voltage value, the voltage sensor coupled to the arithmetic circuit;
   a current sensor configured to measure a current associated with the electrochemical cell to obtain a current value, the current sensor coupled to the arithmetic circuit;
   the arithmetic circuit further configured to calculate a second state of charge value associated with the electrochemical cell utilizing an inverse open circuit voltage function having a parameter determined from the voltage value and the current value;
   the arithmetic circuit further configured to calculate the estimated state of charge value indicating the present state of charge of the electrochemical cell utilizing the second nonlinear cell model based on the first state of charge value, the second state of charge value, the first cell resistance value, the voltage value, and the current value;

the arithmetic circuit further configured to calculate the estimated cell resistance value indicating the present resistance of the electrochemical cell utilizing the first nonlinear cell model based on the first cell resistance value, the first state of charge value, the second state of charge value, the voltage value, and the current value; and the arithmetic circuit further configured to store the estimated state of charge value and the estimated cell resistance value in a storage medium.

6. The system of claim 5, wherein
the arithmetic circuit further configured to predict a first voltage polarization value indicating a present voltage polarization level of the electrochemical cell utilizing the second nonlinear cell model; and the arithmetic circuit further configured to estimate a second voltage polarization value indicating the present voltage polarization level of the electrochemical cell utilizing the second nonlinear cell model based on the first voltage polarization value, the first state of charge value, the voltage value, and the current value.

7. The system of claim 5, wherein
the arithmetic circuit further configured to predict a first hysteresis value indicating a present hysteresis of the electrochemical cell utilizing the second nonlinear cell model; and the arithmetic circuit further configured to estimate a second hysteresis value indicating the present hysteresis of the electrochemical cell utilizing the second nonlinear cell model based on the first hysteresis value, the first state of charge value, the voltage value, and the current value.

8. The system of claim 5, wherein
the arithmetic circuit further configured to predict a first capacity value indicating a present capacity the electrochemical cell utilizing the first nonlinear cell model; and the arithmetic circuit further configured to estimate a second capacity value indicating the present capacity of the electrochemical cell utilizing the first nonlinear cell model based on the first capacity value, first state of charge value, the voltage value, and the current value.

* * * * *